Patented Jan. 15, 1929.

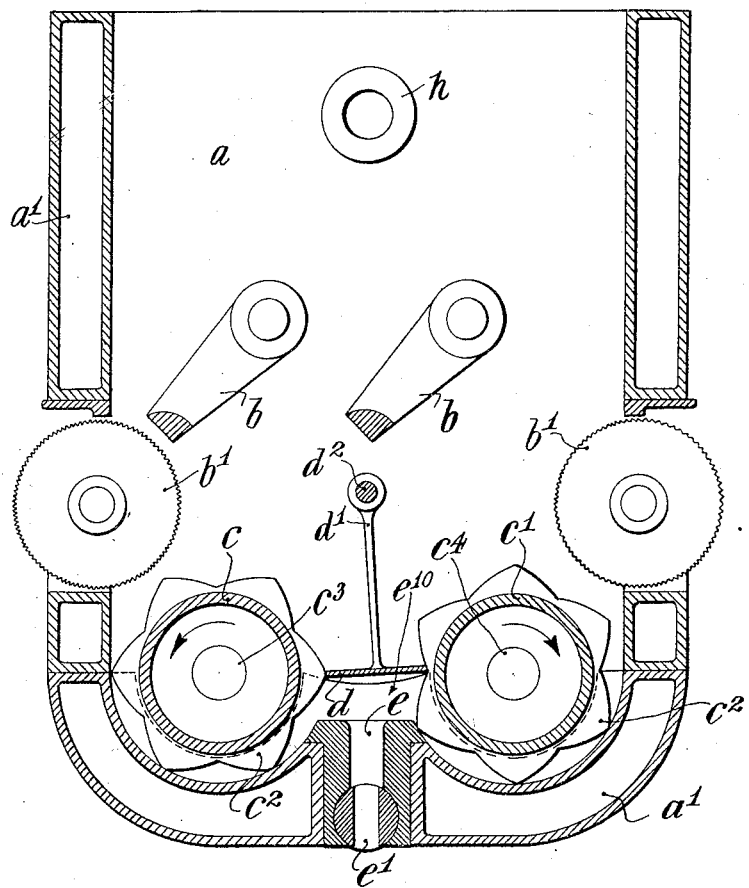

1,699,417

UNITED STATES PATENT OFFICE.

GEORGE DONALD WILSON, OF LONDON, ENGLAND, ASSIGNOR TO BAKER PERKINS CO. INC., OF SAGINAW, MICHIGAN, A CORPORATION OF NEW YORK.

APPARATUS FOR MEASURING AND DEPOSITING PLASTIC SUBSTANCES.

Application filed March 14, 1928, Serial No. 261,690, and in Great Britain March 16, 1927.

This invention relates to apparatus for measuring and depositing plastic substances such as chocolate particularly for the purpose of delivering same into moulds, although not limited to such purpose, and in which there is used a receptacle for the material with measuring and feeding rollers for discharging the material therefrom and means for varying the angular movement given to said rollers for varying the quantities of material discharged.

The rollers are provided on their peripheries or so formed as to produce peripheral teeth, undulations, corrugations or the like which if the axes of the rollers were placed sufficiently close together would more or less engage or intermesh and in conjunction with a portion of the receptacle with the inner wall of which certain of said teeth or undulations contact would form an approximately sealed measuring chamber into which the material is conducted by the rotation of the rollers and forced therefrom through a discharge opening in the receptacle.

The main feature of the present invention consists in placing the axes of the measuring and feeding rollers at a sufficient distance apart for the interposition between the peripheries of the rollers of a movable or oscillatory floating plate which will form the completing wall of the depositing chamber but being fulcrumed or suspended at a suitable point or otherwise mounted so that it will move to and fro during the rotation of the rollers since the edge of the plate is in contact with their peripheries. Thus the plate and the surfaces of the rollers together with the inner wall of the receptacle constitute the depositing chamber and the rotation of the rollers in opposite directions to each other force the material from said chamber through the discharge orifice of the receptacle. The rate of extrusion of each extruded measured quantity is provided for by the rate of revolution of the measuring and feeding rollers and intermittence in the extrusion attained by bringing said rollers to rest.

The provision of a plate such as described permits of dealing with plastic substances such as chocolate which contain lumps such as nuts or fruits which would otherwise become broken or damaged by inter-engagement of the undulations or teeth of the rollers.

The vessel is preferably provided with beaters or stirrers to keep the body of material in motion and additional feed wheels operating on the material by surface friction may also be fitted so as to facilitate and ensure that the material passes to the measuring and feeding rollers.

As apparatus of this character is usually intended to be employed in depositing measured quantities of chocolate or like materials in or on moulds or plates as they pass beneath the extrusion orifice, it is frequently convenient that the vessel as a whole may be rocked or moved in the direction of movement of said moulds during the actual extrusion phase and be returned in the reverse direction during the cut off phase. The vessel may therefore be mounted on trunnions or the like and means may be provided for giving a rocking movement of suitable rate, amplitude and timing.

Inasmuch also as it is generally desirable that the apparatus may be used for depositing in a plurality of rows the depositing chamber is divided by a number of parallel plates of suitable shape so as to constitute a number of separate chambers. The teeth of the measuring and feeding rollers are slotted for the passage of these plates and the latter extend upwards to the lower end of the oscillatory plate.

The accompanying drawing is a cross section of the apparatus according to the present invention.

As is usual in this class of apparatus for measuring and depositing plastic substances, there is provided for the reception of said substances, a vessel or hopper $a$, conveniently jacketted as at $a^1$ for tempering medium and provided with beaters or stirrers $b$ and additional feed wheels $b^1$ with preferably serrated peripheries. Within the vessel $a$ and at the base thereof are two measuring and feeding rollers $c$, $c^1$, provided on their peripheries with teeth $c^2$, the cavities between said teeth and the curved side surfaces of said vessel, with which the rollers contact, forming the measuring chamber.

Now according to the present invention the axes $c^3$, $c^4$, of the rollers $c$, $c^1$ are placed at a distance apart sufficient for the interposition between the peripheries of said rollers of a movable or oscillatory floating plate $d$ carried by arms $d^1$ and fulcrumed at $d^2$.

The vessel $a$ is provided at its base and between the axial centres of the rollers $c$, $c^1$ with a discharge opening $e$ having a valve $e^1$ and the space between the inner wall of the casing $a$ adjacent said discharge opening, the peripheries of the rollers $c$, $c^1$ and the oscillatory plate $d$ constitutes the depositing chamber $e^{10}$.

The rate of extrusion of each extruded measured quantity is dependent on the speed of revolution of the measuring and feeding rollers and intermittence in the extrusion is attained by bringing said rollers to rest and by suitably timed mechanism closing the valve $e^1$.

For the purpose of depositing in a plurality of rows, it is usual to provide transverse dividing plates at intervals along the length of the vessel $a$, said plates conveniently extending up to the hubs of the rollers. It will be understood that the extrusion outlet may be similarly divided into a plurality of nozzles or other forms of delivery opening if desired.

Trunnions $h$ may be provided in the upper part of the vessel $a$ about which said vessel is capable of rocking movement when for example depositing plastic substance into or on moulds, plates or the like.

What I claim as my invention and desire to secure by Letters Patent of the United States is:—

1. Apparatus for measuring and depositing plastic substances comprising in combination a container for the substance to be fed, having a discharge opening therein, peripherally toothed measuring and feeding rollers rotatably disposed within said container and adapted to discharge a measured quantity of said substance through said discharge opening, an oscillatory floating plate, the axes of said rollers being placed at a distance apart sufficient for the interposition between their peripheries of said oscillatory floating plate and said plate forming the completing wall of the depositing chamber bounded by the peripheries of the measuring and feeding rollers and the inner wall of the casing adjacent the discharge opening.

2. Apparatus for measuring and depositing plastic substances comprising in combination a container for the substance to be fed having a discharge opening therein, peripherally toothed measuring and feeding rollers rotatably disposed within said container and adapted to discharge a measured quantity of said substance through said discharge opening, a cut-off valve in the discharge opening, an oscillatory floating plate, the axes of said rollers being placed at a distance apart sufficient for the interposition between their peripheries of said oscillatory floating plate and said plate forming the completing wall of the depositing chamber bounded by the peripheries of the measuring and feeding rollers and the inner wall of the casing adjacent the discharge opening.

3. Apparatus for measuring and depositing plastic substances comprising in combination a container for the substance to be fed having a discharge opening therein, peripherally toothed measuring and feeding rollers rotatably disposed within said container and adapted to discharge a measured quantity of said substance through said discharge opening, a cut-off valve in the discharge opening an oscillatory floating plate, the axes of said rollers being placed at a distance apart sufficient for the interposition between their peripheries of said oscillatory floating plate, said plate, to which oscillations are imparted by the teeth of the rollers during rotation of the latter, being fulcrumed at a point above its points of contact with the peripheries of said rollers and forming the completing wall of the depositing chamber bounded by the peripheries of the measuring and feeding rollers and the inner wall of the casing adjacent the discharge opening.

In witness whereof I have signed this specification.

GEORGE DONALD WILSON.